United States Patent [19]

Snow

[11] Patent Number: 4,785,054
[45] Date of Patent: Nov. 15, 1988

[54] ACRYLIC AMMONIATION

[75] Inventor: Larry G. Snow, Wilmington, Del.

[73] Assignee: E. I. Du Pont de Nemours and Company, Wilmington, Del.

[21] Appl. No.: 137,977

[22] Filed: Dec. 28, 1987

Related U.S. Application Data

[60] Division of Ser. No. 928,365, Nov. 10, 1926, which is a continuation-in-part of Ser. No. 761,838, Aug. 2, 1985, abandoned.

[51] Int. Cl.[4] ............................................. C08F 8/32
[52] U.S. Cl. ................................. 525/208; 525/327.3; 525/379
[58] Field of Search ............................. 525/208, 327.3

[56] References Cited

U.S. PATENT DOCUMENTS

| | | | |
|---|---|---|---|
| 3,969,296 | 7/1976 | Wassenburg et al. | 260/29.6 TA |
| 4,055,541 | 10/1977 | Riew | 260/47 EN |
| 4,089,829 | 5/1978 | Braun et al. | 260/29.6 T |
| 4,235,981 | 11/1980 | Tsuchiya | 525/244 |
| 4,331,793 | 5/1982 | Emmons et al. | 526/260 |
| 4,525,521 | 6/1985 | Den Hartog et al. | 525/208 |

FOREIGN PATENT DOCUMENTS 1483058  8/1977  United Kingdom .
1532245 11/1978  United Kingdom .

Primary Examiner—Joseph L. Schofer
Assistant Examiner—Bernard Lipman
Attorney, Agent, or Firm—Donald W. Huntley

[57] ABSTRACT

An amine-substituted acrylic polymer prepared by reacting an acrylic polymer having glycidyl functionality with amine, under process conditions which result in high amine functionality, and a coating composition incorporating the acrylic polymer as a binder component.

2 Claims, No Drawings

ACRYLIC AMMONIATION

This is a division of application Ser. No. 928,365, filed Nov. 10, 1986, which is a continuation-in-part of copending application Ser. No. 761,838, filed Aug. 2, 1985, now abandoned.

BACKGROUND OF THE INVENTION

Enamels used in the painting of automobiles are typically based on low molecular weight polymers which require lower concentrations of solvent than the higher molecular weight polymers used in lacquers. In enamel compositions, the low molecular weight polymer is crosslinked after application to increase the molecular weight and durability of the cured finish.

It has previously been recognized that amine groups on acrylic resins can be used in the required crosslinking reactions. Amine-substituted polymers have been prepared in the past by first preparing a carboxylic acid functional polymer which is subsequently modified to yield a polymer having primary or secondary amine groups. Such a technique is described, for example, in Den Hartog et al., U.S. Pat. No. 4,525,521. Den Hartog et al. also describes a process in which glycidyl methacrylate or glycidyl acrylate is reacted with ammonia to yield a polymer having an alcohol and primary amine.

The reaction technique of Den Hartog et al. is complicated by the side reactions between the primary amine groups and epoxy groups before all of the epoxy groups have been consumed. This typically results, in the absence of a high concentration of ammonia and the attendant high pressures, in gelatin of the acrylic polymer during the reaction.

SUMMARY OF THE INVENTION

The present invention provides an improved process for the amination of acrylic resins containing glycidyl methacrylate units that results in high amine functionality, but which can be carried out at low pressures, through the use of primary alkyl amines instead of ammonia.

Specifically, the instant invention provides, in the process for reacting an acrylic polymer having glycidyl functionality with amine, the improvement wherein the acrylic polymer has a number average molecular weight about from 1,000 to 20,000 and about from 10 to 40 weight percent glycidyl methacrylate units; the acrylic polymer is reacted with an amine of the general formula RNH2 wherein R is alkyl of 1 to 8 carbon atoms; the acrylic polymer and the amine are reacted at a temperature of about from 25° to 140° C. in an organic liquid which is a solvent for the acrylic polymer, the amine and the resulting amine-substituted polymer formed; the organic liquid is present in an amount which provides a polymer concentration of about from 20 to 70% by weight before amine addition; the amine is present to provide a mole ratio of amine to epoxy units of about from 5:1 to 50:1; and the reaction pressure is about from 1 to 30 atmospheres.

The invention further provides coating compositions based on the resulting amine-substituted acrylic polymer, and comprising 20–80% by weight of a binder and 80–20% by weight of a solvent for the binder, wherein the binder consists essentially of about:

A. 60–80% by weight, based on the weight of the binder, of an acrylic polymer resulting from the present process; and B. 20–40% by weight, based on the weight of the binder, of a glycidyl acrylic crosslinking polymer of polymerized monomers having at least 60% by weight of a glycidyl constituent selected from the group consisting of glycidyl methacrylate and glycidyl acrylate and polymerized monomers selected from the group consisting of alkyl methacrylate and alkyl acrylate each having 2–12 carbon atoms in the alkyl group;

said polymers having a weight average molecular weight of about 6,000–40,000 determined by gel permeation chromotography using polymethyl methacrylate as a standard.

DETAILED DESCRIPTION OF THE INVENTION

The present invention is applicable to acrylic polymers containing about from 10 to 40 weight percent of units derived from glycidyl methacrylate. The acrylic polymer, in addition to the glycidyl methacrylate units, can be prepared from a variety of other unsaturated monomers, including, for example, styrene, butyl acrylate, glycidyl acrylate, methyl acrylate, ethyl acrylate, hydroxyethyl acrylate, propyl acrylate, 2-ethylhexyl acrylate, lauryl methacrylate, methyl methacrylate, butyl methacrylate, ethyl methacrylate, propyl methacrylate, hydroxyethyl methacrylate, and 2-ethyl hexyl methacrylate. The glycidyl methacrylate units in the polymer preferably comprise about from 10 to 20 weight percent.

The acrylic copolymers should have a number average molecular weight of about from 1,000 to 20,000, and molecular weights of about from 4,000 to 12,000 have been found to be particularly satisfactory. In general, acrylic polymers having a molecular weight greater than about 20,000 exhibit a viscosity that makes handling and spraying of the finished product difficult, while acrylic polymers having a molecular weight below 1,000 require chain transfer agents or high initiator concentrations that interfere with the quality of the final product.

In accordance with the present invention, the acrylic polymer having the glycidyl methacrylate units is reacted within an amine of a general formula RHN2, wherein R is alkyl of 1 to 8 carbon atoms, and preferably 1 to 3 carbon atoms. Methylamine is particularly preferred in the instant process, since it has less sterric hinderance that other primary amines. In addition, because of the greater volatility of the methylamine, excess reactant can be more easily removed at the conclusion of the reaction.

The alkyl amines used in the present process are more soluble in common organic solvents than ammonia and are less volatile. Accordingly, these amines can be used at a lower reaction pressure.

In addition, the alkyl amines react with the glycidyl methacrylate epoxy groups faster than ammonia. This allows the use of a smaller excess of methylamine than would be needed if ammonia were used and permits higher solids concentrations and/or lower pressures in the preparation process.

The reaction using the alkylamine can be carried out at a pressure of about from 1 to 30 atmospheres, in contrast to earlier processes using ammonia, in which pressures of at least about 13 atmospheres were needed. For convenience, the present process is preferably operated at a pressure of about from 1 to 7 atmospheres, and a pressure of about from 3 to 7 atmospheres is especially preferred.

While the use of ammonia in the reaction will generally permit the preparation of solutions having up to about 30 weight percent solids, the use of alkylamine will permit somewhat higher solid concentrations, for example, up to about 70 percent. The final solids concentration of the reaction medium will also be affected by the concentration of glycidyl methacrylate units in the polymer, with higher glycidyl methacrylate polymer concentrations resulting in lower total solids in the reaction mixture or higher pressures from the required molar excess of amine.

The acrylic polymer and the alkyl amine are reacted in an organic liquid which is a solvent for the acrylic polymer, the amine and the resulting amine substituted polymers. Such solvents can include, for example, toluene, xylene, methanol, tetrahydrofuran, glyme and alcohols of the general formula ROH, where R is alkyl of 1-8 carbon atoms. Of these, toluene, xylene and mixtures of either of these and methanol wherein the toluene or xylene comprises at least about 50% of the mixture have been found to be particularly satisfactory. The use of alcohols as a component of the solvent, and especially methanol, favors the desired reaction, thereby permitting the use of a lower molar excess of the amine in the process. In addition, the use of alcohol as a solvent component increases the solubility of the amine, thereby reducing the required pressure.

The reaction is carried out at a temperature of about from 25° to 140° C. Temperatures of about from 60° to 80° C. are preferred in a batch process, while temperatures of about from 100° to 120° C. are preferred in a continuous process. Higher temperatures, in general, decrease the gas solubility, requiring higher pressures to keep an equivalent concentration gas in solution.

The alkyl amine used in the instant process is present in an amount to provide a substantial molar excess of amine to the epoxy units present in the glycidyl methacrylate component of the polymer. The alkyl amine, however, permits the use of lower ratios of amine of epoxy units than were previously required, for example, using ammonia. While mole ratios of amine to epoxy units of at least about 30:1 were required using ammonia, the present process can be operated effectively using a ratio of amine to epoxy units of about from 5:1 to 15:1. Using methyl amine, excellent product characteristics can be obtained using an amine to epoxy ratio of greater than about 10:1.

After completion of the reaction, excess amine can be removed with low boiling alcohols or other solvents used in the reaction.

The product resulting from the instant process is characterized by high amine functionality. Typically, 10 to 25 weight percent amine groups based on total polymer weight can be incorporated into the polymers using the instant process. The use of alkyl amine in the instant process, as opposed to ammonia, permits a process flexibility that provides a variety of advantages. The process can be operated at the same pressure as an equivalent process using ammonia to provide greated amine functionality; or at a lower pressure to provide equivalent amine functionality; or at the same pressure and functionality with higher polymer solids content.

The polymers resulting from the instant process can be used in combination with polyfunctional epoxy resins to give a system curable at ambient temperatures, and which offers an alternative to isocyanate curing in enamel coatings.

The instant process is applicable to the amination of polymers containing a substantially higher glycidyl methacrylate concentration than similar processes using ammonia. While prior processes could tolerate no more than about 6% glycidyl methacryate units without gellation, about from 10 to 40 weight % can be used in the instant process. In addition, the products resulting from the instant process exhibit outstanding viscosity stability when compared to those prepared using ammonia. The present products also exhibit faster cure rates with epoxy-containing crosslinkers.

The polymers resulting from the present invention can be incorporated into an enamel composition as a binder component, substantially in accordance with the techniques described in Den Hartog et. al., U.S. Pat. No. 4,525,521, issued June 25, 1985, combining the present hydroxy amino esters with glycidic acrylic crosslinking polymer as a second binder component as described therein. The Den Hartog patent is hereby incorporated by reference.

The present invention is further illustrated by the following specific examples, in which parts and percentages are by weight, unless otherwise indicated. The following abbreviations are used:
Sty=Styrene p0 MMA=Methyl methacrylate
BMA=Butyl methacrylate
GMA=Glycidyl methacrylate
EHMA=2-ethylhexyl methacrylate
LMA=Lauryl methacrylate
HEMA=2-Hydroxyethyl methacrylate In these examples, an epoxy containing acrylic prepolymer was prepared for each example by conventional starved feed free radical polymerization techniques. cl EXAMPLE 1

A 5 liter 3 neck round bottom flask equipped with a mechanical stirrer, feed inlets, reflux condenser and nitrogen inlet was charged with 889.0 g toluene and heated to reflux with stirring under nitrogen. Two feeds were prepared. Feed I was a mixture of 300.0 g styrene, 390.0 g methyl methacrylate, 510.0 g butyl methacrylate and 300.0 g glycidyl methacrylate. Feed II was a mixture of 55.5 g Vazo/67 2,2'-azobis(2-methylbutanenitrile) initiator in 110.0 g toluene. Feeds I and II were begun simultaneously with rates of addition adjusted to give a uniform addition of Feed I over 120 min. and Feed II over 240 min. At the completion of Feed II reflux was maintained for an additional 15 minutes. Upon cooling, the product showed a polymeric solids concentration of 59.4 wt.% with 0.809 milliequivalents epoxy per gram of solution and a Brookfield viscosity of 4560 cps. GPC Mn=8100.

A 1400 ml rocker bomb was charged with 336.7 g prepolymer solution (Sty/MMA/BMA/GMA//20/26/34/20, 59.4 wt. % solids in toluene, Mn=8100) 15.3 g toluene and 150.0 g methanol. The concentration of polymer was 40% by weight. The reactor was cooled in dry ice-acetone and evacuated. Monomethylamine was added (172.0 g ), the reactor sealed and heated to 60° C. with agitation. The mole ratio of amine to epoxy units was accordingly 20:1. Agitation was continued at 60° C. at which temperature a pressure of about 3 atmospheres is attained. The temperature was maintained for 3 hrs. at which time the reactor was cooled to room temperature, vented and product removed. The product was then stripped of excess methylamine and methanol. Atmospheric pressure distillation of 152.2 g solvent was followed by addition of 200.0 g toluene and further distillation of 173.2 g solvent produced a product having 45.1 wt. % solids containing 0.6444 milliequivalents amine per gram of solution and exhibiting a Brookfield viscosity of 670 cps.

In Examples 2-9, prepolymer solution was prepared using the same general techniques shown in Example 1, adjusting the monomer concentration and identity as noted.

EXAMPLE 2

A 5 liter 3 neck round bottom flask was equipped with a gas dispersion tube, mechanical stirrer and reflux condenser which was attached to a gas scrubber containing 500 ml 20% acetic acid in water. The reaction flask was charged with 833.3 g prepolymer solution (Sty/MMA/BMA/GMA//22/24/34/20, 59.7 wt. % solids in toluene Mn=7900), 683.3 g toluene and 983.3 g methanol. The concentration of polymer was 20% by weight. With agitator on, methylamine addition through the gas dispersion tube was begun. Within 30 minutes the reaction temperature had reached 58° C. and began to cool. The reaction was carried out at atmosperic pressure. At this time the methylamine addition was slowed to a slow bubble and heat applied to reflux the solution (62°-63° C.). Four hours after beginning methylamine addition the methylamine was turned off and the apparatus rearranged for distillation. The ratio of amine to epoxy units was 6:1. Excess methylamine and methanol were removed by distillation until a head temperature of 105° C. was reached (1637 q solvent collected). The product was removed, combined with 300 g toluene and characterized. The product had 41.3 wt. % solids, 0.536 milliequivalents amine per gram of solution and exhibited a Brookfield viscosity of 705 cps.

EXAMPLE 3

A one liter pressure reactor was charged with 183.2 g prepolymer solution (Sty/MMA/BMA/GMA//20/30/30/20, 65.5 wt. % solids in xylene, Mn=14,400) and 116.8 g xylene. The reactor was cooled in dry ice-acetone and evacuated. The reactor was then heated to 100' C. at which time 52.4 g monomethylamine was injected. The ratio of amine to epoxy units was 10:1. The reactor was maintained at 100° C. for 90 min to provide a pressure of 16 atmospheres. The reactor was cooled to room temperature, vented and the product removed. The product was precipitated into hexane and vacuum dried. The product contained 1.24 miliequivalents of amine per gram of solid and had a number average molecular wt. of 24,900.

EXAMPLE 4

A one liter pressure reactor was charged with 183.2 g prepolymer solution (Sty/MMA/BMA/GMA//20/30/30/20, 65.5 wt. % solids in xylene, Mn=14,400) and 116.8 g xylene. the reactor was cooled in dry ice-acetone and evacuated. The reactor was then heated to 140' C. at which time 52.4 g monomethylamine was injected. The ratio of amine to epoxy units was 10:1. The reactor was maintained at 140° C. for 30 min to provide a pressure of 20 atmospheres. The reactor was then cooled to room temperature, vented and the products removed. the product was then precipitated into hexane and vacuum dried. The product contained 1.19 miliequivalents of amine per gram of solids and had a number average molecular weight of 25,600.

EXAMPLE 5

A one liter pressure reactor was charged with 183.2 g prepolymer solution (Sty/MMA/BMA/GMA//20/30/30/20, 65.5 wt. % solids in xylene, Mn=14,400), 45.0 g methanol and 71.8 g xylene. The reactor was cooled in dry ice-acetone and evacuated. The reactor was then heated to 80' C. at which time 52.4 g monomethylamine was injected. The ratio of amine to epoxy units was 10:1. The reactor was maintained at 80° C. for 3 hrs to provide a pressure of 8 atmospheres. The reactor was then cooled to room temperature, vented and the products removed. The product was stripped of methanol on a rotary evaporator, precipitated into hexane and vacuum dried. The product contained 1.13 miliequivalents of amine per gram of solids and showed a number average molecular weight of 17,000.

EXAMPLE 6

A one liter pressure reactor was charged with 274.8 g prepolymer solution (Sty/MMA/BMA/GMA//20/30/30/20, 65.5 wt. % solids in xylene, Mn=14,400), and 25.2 g xylene. The reactor was cooled in dry ice-acetone and evacuated. The reactor was then heated to 80° C. at which time 79.0 g monomethylamine was injected. The ratio of amine to epoxy units was 10:1. The reactor was maintained at 80° C. for 3 hrs to provide a pressure of 14 atmospheres. The reactor was then cooled to room temperature, vented and the products removed. The product was stripped of methanol on a rotary evaporator, precipitated into hexane and vacuum dried. The product contained 1.29 miliequivalents of amine per gram of solids and had a number average molecular weight of 16,400.

EXAMPLE 7

A one liter pressure reactor was charged with 183.2 g prepolymer solution (Sty/MMA/BMA/GMA//20/30/30/20, 65.5% solids in xylene, Mn=14,400), 12.0 g methanol and 104.8 g xylene. The reactor was cooled in dry ice-acetone and evacuated. The reactor was then heated to 80° C. at which time 157.0 g monomethylamine was injected. The ratio of amine to epoxy units was 30:1. The reactor was maintained at 80° C. for 3 hrs to provide a pressure of 16 atmospheres. The reactor was then cooled to room temperature, vented and the product removed. Ihe product was stripped of methanol on a rotary evaporator, precipitated into hexane and vacuum dried. The product contained 1.24 miliequivalents of amine per gram of solids and showed a number average molecular weight of 15,200.

EXAMPLE 8

A one liter pressure reactor was charged with 333.3 g prepolymer solution (Sty/MMA/BMA/GMA//20/30/30/20, 65.5 wt. % solids in xylene, Mn=14,400), 16.7 g xylene and 150.0 g methanol. The reactor was cooled in dry ice-acetone and evacuated. The reactor was then heated to 80° C. at which time 166.4 g n-propylamine was injected. The ratio of amine to epoxy units was 10:1. The reactor was maintained at 80° C. for 3 hrs to provide a pressure of 3 atmospheres. The reactor was then cooled to room temperature, vented and the products removed. The product was stripped of methanol on a rotary evaporator, precipitated into hexane and vacuum dried. The product contained 1.31 miliequivalents of amine per gram of solids and showed a number average molecular weight of 16,300.

COMPARATIVE EXAMPLE A

A 1 gallon autoclave was charged with 666.7 g prepolymer (STY/MMA/BMA/GMA//26/24/34/16, 58.3 wt % solids in toluene, Mn=5400), 533,3 g toluene, and 800.0 g methanol. The concentration of polymer was 20% by weight. The reactor was cooled in dry ice-acetone and evacuated. Anhydrous ammonia was added (440 g) and the reactor sealed. The ratio of amine to epoxy units was 46:1. With agitation the reactor was heated to 60° C. to provide a pressure of 8 atmospheres and held at the temperature for 18 hrs. The reactor was then cooled to room temperature, vented and the products removed. The product was stripped of excess ammonia and methanol by rotary evaporation to 55.1 wt % solids. Product showed an amine concentration of 0.540 milliequivalents per gram of solution and exhibited a Brookfield viscosity of 980 cps.

COMPARATIVE EXAMPLE B

A 1400 ml rocker bomb was charged with 333.3 g prepolymer solution (Sty/EHMA/GMA//26/54/20, 58.1% solids in toluene, Mn=4800), 266.7 g toluene and 400. g methanol. The concentration of polymer was 20% by weight. The reactor was cooled in dry ice-acetone and evacuated. Anhydrous ammonia was added (200.0 g), the reactor sealed and heated to 80° C. The ratio of amine to epoxy units was 46:1. The reactor was held at 80° C. for 3 hrs with agitation. The resulting pressure was 10 atmospheres. The reactor was then cooled to room temperature, vented and the products removed. The product was stripped of excess ammonia and methanol by rotary evaporation to 56.1 wt. % solids. The product had an amine concentration of 0.629 milliequivalents per gram of solution and exhibited a Brookfield viscosity of 1625 cps.

COMPARATIVE EXAMPLE C

A 1400 ml rocker bomb was charged with 243.5 g prepolymer solution (BMA/LMA/GMA//46/24/30, 57.5% solids in toluene, Mn=4900), 182.6 g toluene and 280 g methanol. The concentration of polymer was 20% by weight. The reactor was cooled in dry ice-acetone and evacuated. Anhydrous ammonia was added (250 g), the reactor sealed and heated to 60° C. at which temperature it was agitated for 18 hrs. The resulting pressure was 10 atmospheres, and the amine to epoxy ratio was 48:1. The reactor was then cooled to room temperature, vented and the product removed. The excess ammonia and methanol were removed by rotary evaporation to 45.9 wt. % solids. The product had an amine concentration of 0.871 milliequivalents per gram of solution and exhibited a Brookfield viscosity of 180 cps.

I claim:

1. An amine-substituted acrylic polymer prepared by reacting an acrylic polymer having glycidyl functionality with amine, the improvement wherein the acrylic polymer has a number average molecular weight about from 1,000 to 20,000 and about from 10 to 40 weight percent glycidyl methacrylate units; the acrylic polymer is reacted with an amine of the general formula $RNH_2$ wherein R is alkyl of 1 to 8 carbon atoms; the acrylic polymer and the amine are reacted at a temperature of about from 25 degrees to 140 degrees C. in an organic liquid which is a solvent for the acrylic polymer, the amine and the resulting amine-substituted polymer formed; the organic liquid is present in an amount which provides a polymer concentration of about from 20 to 70% by weight before amine addition; the amine is present to provide a mole ratio of amine to epoxy units of about from 5:1 to 50:1; and the reaction pressure is about from 1 to 30 atmospheres, to provide a polymer having about from 5 to 20 amine groups per polymer chain.

2. A coating composition comprising 20–80% by weight of a binder and 80–20% by weight of a solvent for the binder, wherein the binder consists essentially of about:
   A. 60–80% by weight based on the weight of the binder of an acrylic polymer of claim 1; and
   B. 20–40% by weight, based on the weight of the binder, of a glycidyl acrylic crosslinking polymer of polymerized monomers having at least 60% by weight of a glycidyl constituent selected from the group consisting of glycidyl methacrylate and glycidyl acrylate and polymerized monomers selected from the group consisting of alkyl methacrylate and alkyl acrylate each having 2-12 carbon atoms in the alkyl group;

said polymers having a weight average molecular weight of about 6,000–40,000 determined by gel permeation chromotography using polymethyl methacrylate as a standard.

* * * * *